United States Patent [19]

Stearns

[11] Patent Number: 5,270,729
[45] Date of Patent: Dec. 14, 1993

[54] IONOGRAPHIC BEAM POSITIONING AND CROSSTALK CORRECTION USING GREY LEVELS

[75] Inventor: Richard G. Stearns, Mountain View, Calif.

[73] Assignee: Xerox Corporation, Stamford, Conn.

[21] Appl. No.: 720,273

[22] Filed: Jun. 21, 1991

[51] Int. Cl.⁵ .................................................. B41J 2/39
[52] U.S. Cl. ...................................... 346/1.1; 346/159
[58] Field of Search .................... 346/1.1, 159, 155; 250/396 R

[56] References Cited

U.S. PATENT DOCUMENTS

| | | | |
|---|---|---|---|
| 4,463,363 | 7/1984 | Gundlach et al. | 346/159 |
| 4,524,371 | 6/1985 | Sheridon et al. | 346/159 |
| 4,644,373 | 2/1987 | Sheridon et al. | 346/159 |
| 4,719,481 | 1/1988 | Tuan et al. | 346/159 |
| 4,727,388 | 2/1988 | Sheridon et al. | 346/159 |
| 4,794,412 | 12/1988 | Casey et al. | 346/159 |
| 4,799,071 | 1/1989 | Zeise et al. | 346/160 |
| 4,879,194 | 11/1989 | Snelling | 346/159 X |
| 4,972,212 | 11/1990 | Hauser et al. | 346/159 |
| 4,973,994 | 11/1990 | Schneider | 346/159 |
| 4,996,425 | 2/1991 | Hauser et al. | 346/159 X |
| 5,003,327 | 3/1991 | Theodoulou et al. | 346/154 |
| 5,087,933 | 2/1993 | Stearns | 346/159 |

FOREIGN PATENT DOCUMENTS

| | | |
|---|---|---|
| 56-0022392 | 8/1982 | Japan . |
| 60-136073 | 12/1987 | Japan . |
| 2-0033878 | 10/1991 | Japan . |

OTHER PUBLICATIONS

N. K. Sheridon, "Practical Air Assisted Ionographic Printing", Proceedings, SPIE-The International Society For Optical Engineering, vol. 1252, Feb. 13-14, 1990.

*Primary Examiner*—Benjamin R. Fuller
*Assistant Examiner*—David Yockey
*Attorney, Agent, or Firm*—Anglin & Giaccherini

[57] ABSTRACT

The Ionographic Beam Positioning And Crosstalk Correction Using Grey Levels is a method and apparatus which solves the problem of poor density and definition of an image formed by an ion current (20) projected from an ionographic print head (10), caused by electric field crosstalk between adjacent modulation electrodes (22) in the head (10). By applying a partial modulation voltage ($V_M'$) to the adjacent modulation electrodes (22), the density of an individual pixel charge is increased and the pixel charge is "addressed" or deflected to a position on a receptor surface (26) more precise than the pitch dimension between modulation electrodes (22). A data processor (46) intercepts printing driver commands (44) and constructs therefrom values of partial modulation voltage ($V_M'$) by means of an algorithm making deliberate use of the crosstalk phenomenon. The algorithm is pre-defined with respect to image-dependent modulation voltage states and implemented as programmed software or firmware. The partial modulation voltage ($V_M'$) is applied to correlated modulation electrodes (22) in response to the printing driver commands (44), by a controller (50) using modified printing commands (48) to produce a corrected image.

9 Claims, 7 Drawing Sheets

IONOGRAPHIC BEAM POSITIONING AND CROSSTALK CORRECTION USING GREY LEVELS

CROSS REFERENCES TO RELATED APPLICATIONS

Cross reference is made to U.S. patent application Ser. No. 07/636,326, entitled "In Situ Ionographic Uniformity Correction", filed Dec. 31, 1990 and U.S. patent application Ser. No. 07/636,883, entitled "Feedback Scheme For Ionographic Calibration", filed Dec. 26, 1990, both of which are assigned to the same assignee as the present application.

INCORPORATION BY REFERENCE

U.S. Pat. No. 4,524,371 to Sheridon, et al., U.S. Pat. No. 4,463,363 to Gundlach, et al., U.S. Pat. No. 4,644,373 issued to Sheridan, et al., all of which are assigned to the same assignee as the present application, are incorporated herein by reference.

BACKGROUND OF THE INVENTION

The present invention is a method and apparatus that provides a system for improving the addressability and density of an ionographic printing image by crosstalk correction and ion beam positioning of individual pixel charges, using compensating modulation voltages, also known as "grey levels", applied directly to individual modulation electrodes in the print head.

Ionographic printing is that type in which charged particles are created at a remote location from the point at which a charge latent image is formed on a dielectric surface of a conductive substrate receptor. A stream of ions, assisted in some known systems by a fluid stream, generally an air stream, passes through a channel in the print head in which is placed a linear array of modulation electrode fingers, one for each pixel in a line of the printed image. Ions are created in a chamber, for example, by electrical discharge from a corona wire, maintained at very high positive voltage. During the printing process, the stream of ions is projected toward the receptor, usually a drum, which is placed at a high, negative electrical potential so as to attract the ions to its dielectric surface. Those ions which are projected from the printing head are pulled to the dielectric, overcoated surface of the receptor where they form a charge image, ready for immediate Xerographic-type development into a printed image. Application of low modulation voltages to the electrode fingers creates an electric field which can deflect the ions and locally eliminate them from the stream, producing varying densities of ions and thus varying density of the subsequently printed image. Three patents, U.S. Pat. No. 4,463,363, to Gundlach, et al., U.S. Pat. No. 4,524,371 to Sheridon, et al., and U.S. Pat. No. 4,644,373 to Sheridan et al., disclose different forms of a fluid jet assisted ion projection printing apparatus.

In ionographic printing, improvement in addressability and correction of the reduction in image density resulting from deflection of charges in the ion beam caused by redirection of the electric field associated with one of the modulation electrode fingers held at the modulation voltage, into an ion stream associated with an adjacent modulation electrode, referred to modulation electrode crosstalk interaction, is important in producing high-quality printed images. The crosstalk problem is very troublesome in binary and grey-scale printing. Modulation electrode crosstalk interaction is a phenomenon in which the electric field produced in adjacent, fully or partially modulated electrodes has the unwanted effect of locally eliminating ions from the projected stream, thus reducing the density of charges deposited on the receptor by the image-forming ion stream. Unless these crosstalk effects on the ion stream are corrected, unacceptable variations occur in the printed image of fine lines and edges.

Known systems have addressed the problem of controlling ion perturbation at the imaging surface, known as blooming, caused by the effect of previously deposited ions on the path of subsequent ions directed toward the imaging surface, by use of control electrodes positioned adjacent the ion stream path. U.S. patent application Ser. No. 07/636,326, entitled "In Situ Ionographic Uniformity Correction" solves the problem of non-uniformity of image density by rapidly calibrating the ion current associated with each modulation electrode of a print array in an ionographic printing head using a simplified ion sensor which senses the ion current flow from groups of addressed modulation electrodes and adjusts the current in each to a uniform value during printing to produce high quality images of uniform density. U.S. patent application Ser. No. 07/633,883, entitled "Feedback Scheme For Ionographic Calibration" discloses a method and apparatus for producing uniform ion current which includes a calibration array, having electrodes corresponding to the modulation electrodes, positioned between the printing head and the receptor surface. The ion current sensed by each electrode of the calibration array is compared to a desired value of modulation voltage based on average modulation voltage and printing head characteristics, and a corrected modulation voltage is fed back to the corresponding modulation electrode in the printing head array, thereby adjusting the ion current across the corresponding modulation electrode to the uniform, calibrated value.

The problem of correcting ionographically printed images for crosstalk interaction has presented a major challenge to designers of ionographic devices. The development of a straightforward method of compensating for interaction between adjacent modulation electrodes in an ionographic printing head is a long-felt need and would represent a major technological advance in the ionographic printing field.

SUMMARY OF THE INVENTION

The Ionographic Beam Positioning And Crosstalk Correction Using Grey Levels is a method and apparatus for improving the addressability and density of an image formed from individual pixel charges deposited on a dielectric surface of a receptor in an ionographic print head by a stream of ion charges moving through a modulation channel, over modulation electrodes in the print head, biased to permit ion current flow. The invention solves the problem of the reduction of image density and definition caused by reduction in density of charges when the ion stream passes over an addressed modulation electrode biased "on" to permit ion current flow while adjacent modulation electrodes are biased "off", that is, fully or partially modulated to prevent or reduce ion current flow. A modulation electrode is biased "on" by placing it at reference voltage $V_H$. The invention takes deliberate advantage of this crosstalk phenomenon by determining values of partial modulation voltage (called "grey-levels") and to apply the voltages so computed to the addressed electrode and its neighbors, replacing the modulation voltage which would otherwise be present, during the imaging process. A data processor intercepts printing driver commands and applies a pre-defined and implemented algorithm which determines the values of the partial modulation voltage to be applied to the appropriate modulation electrode. A control device addresses the modulation electrodes and applies a partial modulation voltage, a full value of modulation voltage, or the print head reference or ground voltage, to each modulation electrode when driven by modified printing commands determined by the algorithm. By applying such partial modulation voltage, the density of an individual pixel charge can be increased and the pixel charge can be "addressed" or deflected to a position on the receptor surface more precise than the pitch dimension between modulation electrodes. Ability to position precisely the edge of a printed line or character is a powerful aide in reducing jagged edges of lines and characters, which greatly improves printed image quality.

An appreciation of other aims and objectives of the present invention and a more complete understanding of this invention may be achieved by studying the following description of a preferred embodiment and by referring to the accompanying drawings which are shown for the purpose of illustrating an embodiment of the invention and not for limiting the same.

BRIEF DESCRIPTION OF THE DRAWINGS

FIG. 2(a) is useful in understanding the effects of electric field crosstalk.

DETAILED DESCRIPTION OF A PREFERRED EMBODIMENT

Figure 1:
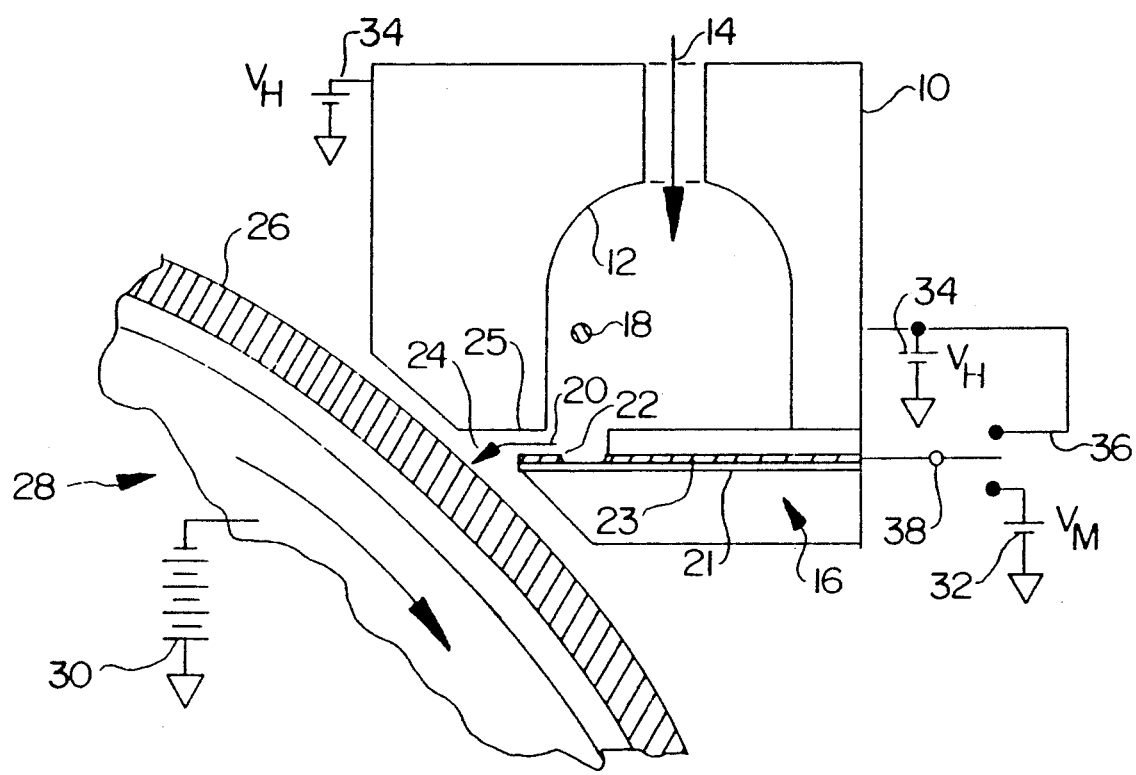
FIG. 1 schematically shows an ionographic print head of the type contemplated for use with the present invention, in printing relationship with an imaging surface.

FIG. 1 shows a schematic representation of a cross-section of the printing head 10 of a fluid jet assisted ionographic printing apparatus similar to that described in commonly assigned U.S. Pat. No. 4,644,373 to Sheridon, et al.

Within head 10 is an ion generation chamber 12 including a corona wire 18, supported within the chamber 12 and supplied with a high potential voltage on the order of several thousand volts D.C. The corona discharge around corona wire 18 creates a source of ions of a given polarity (preferably positive) which are attracted to the wall of the ion chamber 12, held at a potential of $V_H$, and fill the chamber 12 with a space charge.

A pressurized transport fluid 14, preferably air, from a suitable source is introduced to the ion chamber 12 to serve as a medium for moving ions in a stream. A modulation channel 24 directs the transport fluid 14 out of the chamber 12. As the transport fluid 14 passes through the ion chamber 12 it entrains ions and moves them into the modulation channel 24 past modulation electrodes 22. During the printing process, ions are allowed to pass out of the head 10, through the modulation channel 24 as a stream and are directed toward a dielectric surface 26 on a receptor 28, placed at a high negative potential, where they form a charge image, ready for Xerographic-type development (not shown) into a printed image. The modulation electrodes 22 are individually switched between a modulation voltage source 32 and a reference potential 34 by a switching arrangement 38. In the case depicted, applying a low, positive modulation voltage $V_M$ to as modulation electrode 22 locally eliminates ions from the ion stream. Applying reference voltage $V_H$ to a modulation electrode 22 allows a stream of ions to flow past the modulation electrode 22. The resultant ion current 20 is attracted to the receptor 28. The switching arrangement 38 may produce a binary image, for example black and white, or grey levels may be introduced by providing a continuously variable modulation voltage $V_M$ to the modulation electrodes 22. The modulation electrodes 22 are arranged in a print array 16 constructed as a thin film layer 21 supported by an insulating substrate 23. In FIG. 1 and in FIGS. 2(a), 2(b), 3 and 4, the modulation voltage is schematically shown as being supplied by a battery. It will be appreciated by those practiced in the art that the modulation voltage $V_M$ may have any value consistent with the printing circumstances and it may be fixed or variable. As an alternative to an ionographic printing head 10 with fluid jet assisted ion flow, it will be appreciated that other ionographic print heads with another medium for transporting the ion stream may be provided. The ion stream could be field directed to the receptor 28. While the description herein assumes positive ions, appropriate changes could be made so that negative ions may be used.

Figure 2A:
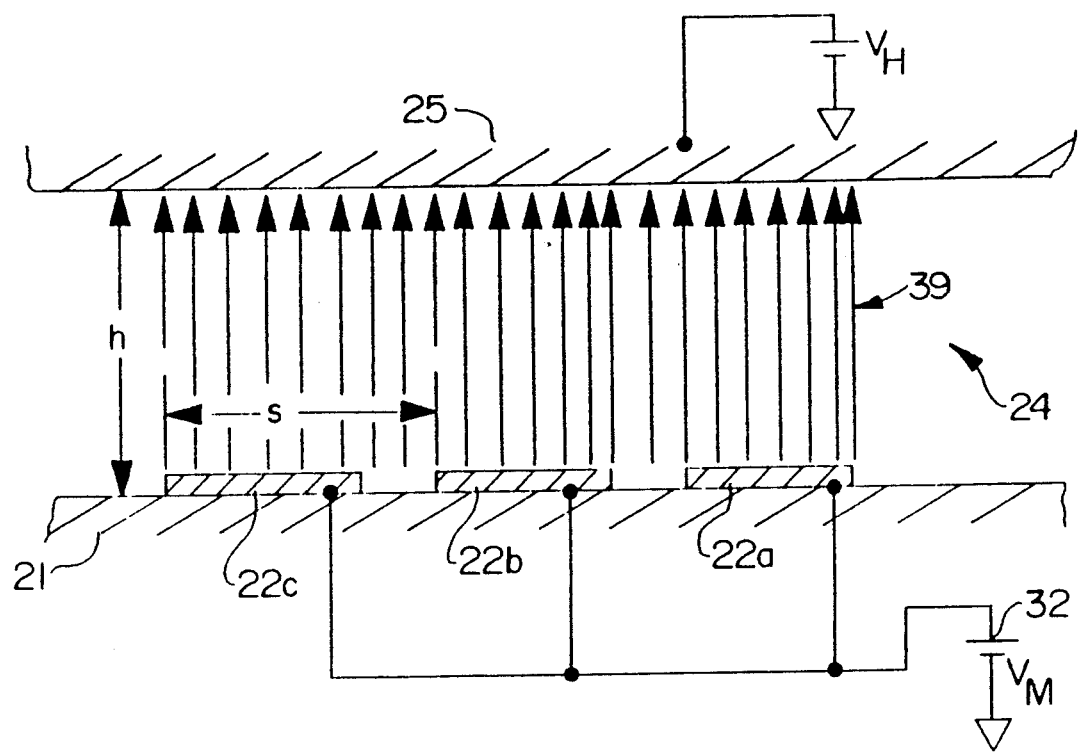
FIG. 2(a) is a cross-sectional view through the modulation channel of an ionographic print head, schematically showing the electric field associated with three modulation electrodes placed at a potential which cuts off the flow of ion current to the imaging surface.
Figure 2B:
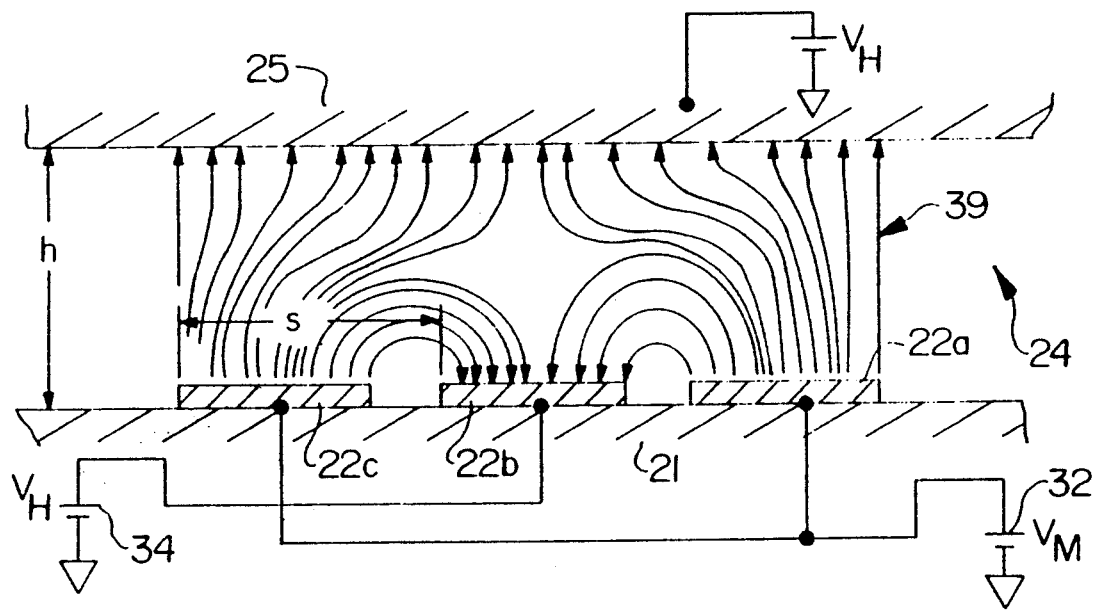
FIG. 2(b) is a cross-sectional view through the modulation channel of an ionographic print head, schematically showing interaction in the electric field associated with three modulation electrodes, the center one of which is placed at a potential permitting the flow of ions to the imaging surface and the two adjacent ones which are placed at a potential which cuts off the flow of ions to the imaging surface.

FIGS. 2(a) and 2(b) each depict a cross section, of the relatively narrow modulation channel 24 of head 10, showing three of the complement of modulation electrodes 22a,b,c in the print array 16. Modulation electrodes 22a,b,c and the opposite wall 25 of the modulation channel 24, held at reference potential $V_H$, comprise a capacitor, across which a voltage potential of source 32 may be applied, when connected by switch 38. Thus, an electric field 39, extending in a direction transverse to the direction of transport fluid flow, is selectively established between a given modulation electrode 22a,b,c and the opposite wall 25.

FIG. 2(a), schematically shows an electric field 39 associated with the modulation electrodes 22a,b,c, when they, and all other modulation electrodes 22 not shown, are placed at a modulation voltage $V_M$. The electric field 39 influences the ion stream passing between the electrodes 22a,b,c and the opposite wall 25, affecting the flow of ion current 20 exiting the ion projector toward the imaging surface 26 by locally removing ions from the ion stream. The voltage applied to each of the electrodes 22, relative to the potential of the opposite wall 25, determines the degree to which that portion of the ion "beam" passing between each of the electrodes 22 and the wall 25 is affected.

FIG. 2(b) depicts "writing" of a selected spot which forms part of an image, by connecting one modulation electrode 22b to the reference potential source 34, held at $V_H$ while the adjacent modulation electrodes 22a, 22c and all others not shown in the print array 16 are held at $V_M$. The ion stream passing between the modulation electrode 22b and the opposite wall is allowed to exit from the ion projector and the transport fluid will carry the "writing" ions to accumulate on the receptor 28. In normal printing, the resolution of this process is roughly about the center-to-center spacing s between modulation electrodes 22. For example, by positioning modulation electrodes at period of 300 per inch, an ion "beam" may be generated that will produce an ionographic image of 300 spots per inch (spi) resolution. Each single spot is sometimes referred to as a "pixel" (picture element). The "writing" process is affected by a number of factors, one of the most important of which is the phenomenon of electric field crosstalk interaction between adjacent modulation electrodes 22.

FIG. 2(b) shows that the electric field lines associated with the modulation electrodes 22a,c, held at $V_M$, when influenced by modulation electrode 22b, held at $V_H$ no longer extend directly across the transverse section of the modulation channel 24, but have a component along the length dimension of the modulation channel 24 which interacts with the ion stream flowing past the modulation electrode 22b held at $V_H$. The effect of this interaction is to reduce the number of ions flowing in the "beam" associated with the "writing" modulation electrode 22b held at $V_H$. In addition, the horizontal components of the electric field 39 act to deflect the ion "beam" laterally as it passes through the modulation channel 24. The configuration of FIG. 2(b) typically corresponds to the "writing" of a single pixel line. The effect of cross talk interaction in this case is mainly seen to be a reduction in width of a single pixel spot. Such a reduction in spot profile has, in the past, been considered a disadvantage and crosstalk interaction between neighboring modulation electrodes 22 has been considered undesirable.

Cross talk interaction is very sensitive to the ratio of modulation channel height h to the spacing s of modulation electrodes 22. The effect is clearly more pronounced for larger values of h/s. For a typical device, h/s is about 1.5. The level of cross talk interaction that accompanies this ratio reduces the integrated ion current 20 of a single pixel spot by about 70 per-cent of expected integrated ion current 20. The present invention uses to advantage that crosstalk interaction which prior art has found disadvantageous.

Figure 3:
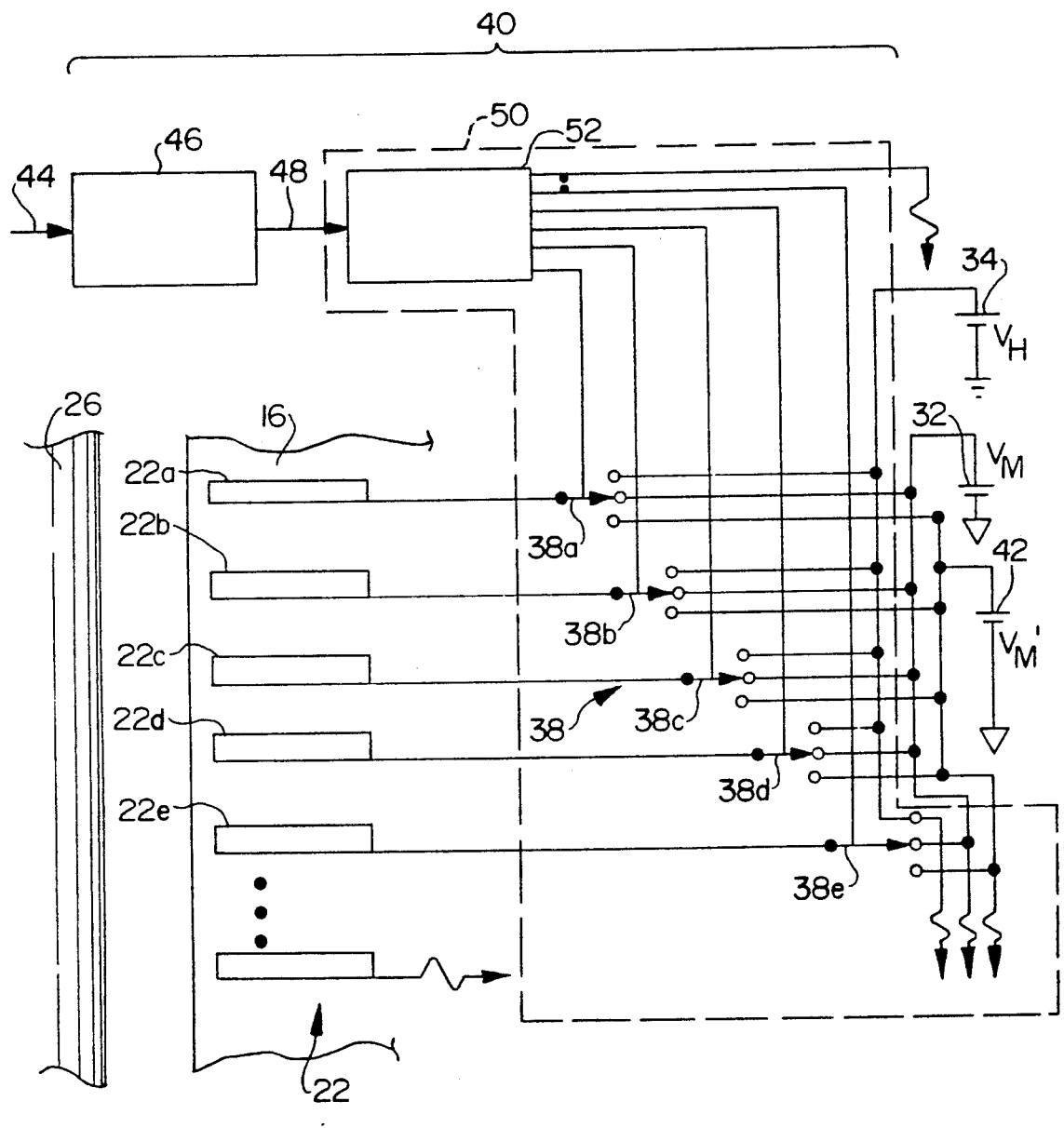
FIG. 3 is a schematic diagram of a preferred embodiment of the present invention used in an ionographic print head, useful for the limited case of binary printing.

FIG. 3 depicts schematically a preferred embodiment of the present invention used in an ionographic printing device, useful for the limited case of binary printing, that is, printing of a two color image such as black and white. In accordance with the present invention, the effect of cross talk interaction is used to increase the density of the ions flowing to the imaging dielectric surface 26 of the receptor 28 by increasing the integrated flow of ion current 20.

A charge output compensator 40 for compensating each "writing" spot, having a data processor 46, which includes a pre-defined and implemented algorithm and a controller 50, is used to correct the printing driver commands 44 normally used in ionographic devices to produce the image. Modulation voltage $V_M$ at each modulation electrode 22, defined by the printing driver commands 44 is appropriately replaced by the data processor 46 and controller 50 with a partial modulation voltage $V_M'$, having a value between the reference voltage $V_H$ and full modulation voltage $V_M$. The invention thereby increases the density of ion charges at the imaging dielectric surface 26 and increases the ability to position the pixel spot on the dielectric surface 26. The ability to position more precisely the edge of a printed line or character is a powerful aide in reducing edge "jaggedness", thereby greatly improving printed image quality.

The data processor 46 and controller 50 may be integrated in a conventional central processing unit (CPU) such as a personal computer. The predefined algorithm is implemented therein as programmed software or firmware. The algorithm is pre-defined before the imaging processing takes place, with respect to the image-dependent modulation voltage states, having regard for the characteristics of the printing head 10 and dimensions of the modulation channel 24. Typical algorithms and their development are discussed, infra.

FIG. 3 shows a portion of print array 16 containing several individual modulation electrodes 22a,b,c,d,e. The modulation electrodes 22a,b,c,d,e are connected selectively to voltage source 34, voltage source 32 and voltage source 42 through three-position switches 38a,b,c,d,e. The switches are positioned by means of a switch controller 52 in response to modified printing commands 48 supplied by a data processor 46. Reference to this simplified case is useful in understanding the invention and is not intended to limit the application of the invention to such a case. It will be appreciated that the three-position switches 38 may be replaced with other electronic devices and their function may be integrated within the switch controller 52. The more general case of grey-level printing is presented in the arrangement shown in FIG. 4.

In the arrangement of FIG. 3, printing driver commands 44, normally produced in a central processing unit remote from the printing device, are intercepted in the data processor 46 in which the pre-defined algorithm is implemented. The algorithm responds, by conventional data processing means, to a plurality of printing driver commands 44 and constructs a plurality of modified printing commands 48. The modified printing commands 48 then drive the switch controller 52 which, in accordance with the modified printing commands 48, positions switches 38 to connect voltage source 34, voltage source 32 or voltage source 42 to each one of modulation electrodes 22. The algorithm in this arrangement is predefined and implemented in the following manner:

The following notation is used to indicate the voltage states of the modulation electrodes 22: a value of 1 indicates the modulation electrode is to be connected to a reference voltage $V_H$, allowing ion current 20 to flow; a value of 0 indicates the modulation electrode 22 is to be connected to a full modulation voltage $V_M$ effectively blocking ion current flow; values between 0 and 1 indicate the modulation electrode 22 is to be connected to a partial modulation voltage $V_M'$ which is a fraction of full modulation voltage $V_M$, thereby only partially blocking ion current 20 flow.

If, for example, an individual modulation electrode 22c is selected as the one to "write" a spot, the printing driver commands 44 will call for individual modulation electrode 22c to be provided with a reference voltage $V_H$ while calling for the neighboring modulation electrodes 22a,b,d,e to be provided with a modulation voltage $V_M$. For an ionographic device having a ratio of h/s of approximately 1.5 excellent compensation of the "writing" modulation electrode 22c is obtained when the modulation electrodes 22b,d on either side of the "writing" modulation electrode 22c are provided with a partial modulation voltage $V_M'$ equal to $V_M/2$, replacing $V_M$. The voltage states of the neighboring modulation electrodes 22a,b,c,d,e in such case, may be written using the aforementioned notation, as: 0, ½, 1, ½, 0.

If it is desired to "write" a spot having a width of two pixels, for the same ionographic device, the states of the modulation electrodes 22a,b,c,d,e, which provide for compensation of the "writing" modulation electrodes 22, for example electrode 22c and electrode 22d, may be written using the aforementioned notation in the form: 0, ½, 1, 1, ½. In all of these cases, the compensation shown is symmetric about the "writing" pixel or pixels so that the corrected ion "beam" retains its average location at the imaging dielectric surface 26. Asymmetric compensation of the ion "beam" has important uses in reducing or eliminating discontinuities in the edges of printed lines or characters sometimes called "jaggedness". These uses are illustrated more fully in the discussion describing FIGS. 4, 6 and 7.

It should be readily apparent that the states of each of the modulation electrodes 22 can be described in a similar manner and readily implemented as an algorithm by software or firmware in the data processor 46. Modifications of the values and descriptions of these states and their implementation in other ionographic devices of different dimensions or configuration may be made in analogous fashion.

Figure 4:
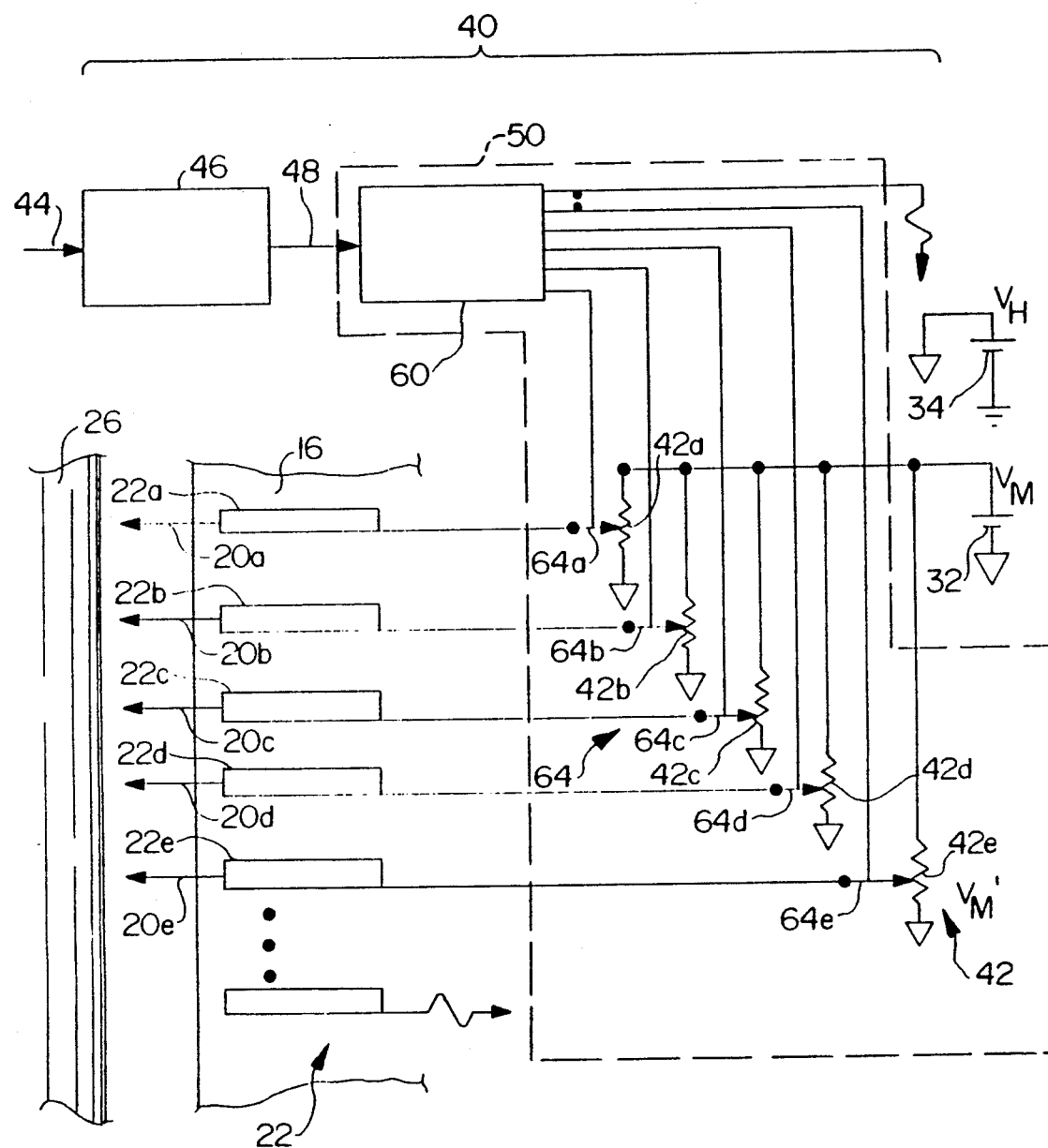
FIG. 4 is a schematic diagram of another aspect of the present invention used in an ionographic print head, useful for the general case of grey-level printing.

FIG. 4 depicts another aspect of the invention useful in the more general case of grey-level printing. In this arrangement, the electronic switches 38, earlier described, are replaced by voltage adjustment devices 64, shown for illustrative purposes as potentiometers 64a,b,c,d,e. A voltage adjustment controller circuit 60 replaces the switch controller 52 of the arrangement shown in FIG. 3. Other types electronic devices having the same function may be substituted for the potentiometers 64a,b,c,d,e and their function integrated within the voltage controller circuit 60. The voltage controller circuit 60 may comprise software or firmware within a central processing unit, for example an expansion board in a personal computer.

In FIG. 4, as was the case in the arrangement shown in FIG. 3, printing driver commands 44, normally produced in a central processing unit remote from the printing device, are intercepted in a data processor 46 in which a pre-defined algorithm is implemented. The algorithm responds, by conventional data processing means, to a plurality of printing driver commands 44 and constructs a plurality of modified printing commands 48. The modified printing commands 48 then drive the voltage adjustment controller circuit 60 which, in accordance with the modified printing commands 48, positions the potentiometers 64a,b,c,d,e to provide a value of voltage $V_M'$ derived from voltage sources 42a,b,c,d,e. The values of voltage $V_M'$ picked from potentiometers 64a,b,c,d,e are supplied respectively to electrodes 22a,b,c,d,e. The algorithm for compensating the "writing" pixel spot in this embodiment is pre-defined and implemented in the same manner as that describe earlier. In this arrangement the value of partial modulation voltage $V_M'$ may be continuously adjusted by the algorithm between the reference voltage $V_H$ and the modulation voltage $V_M$.

Figure 5A:
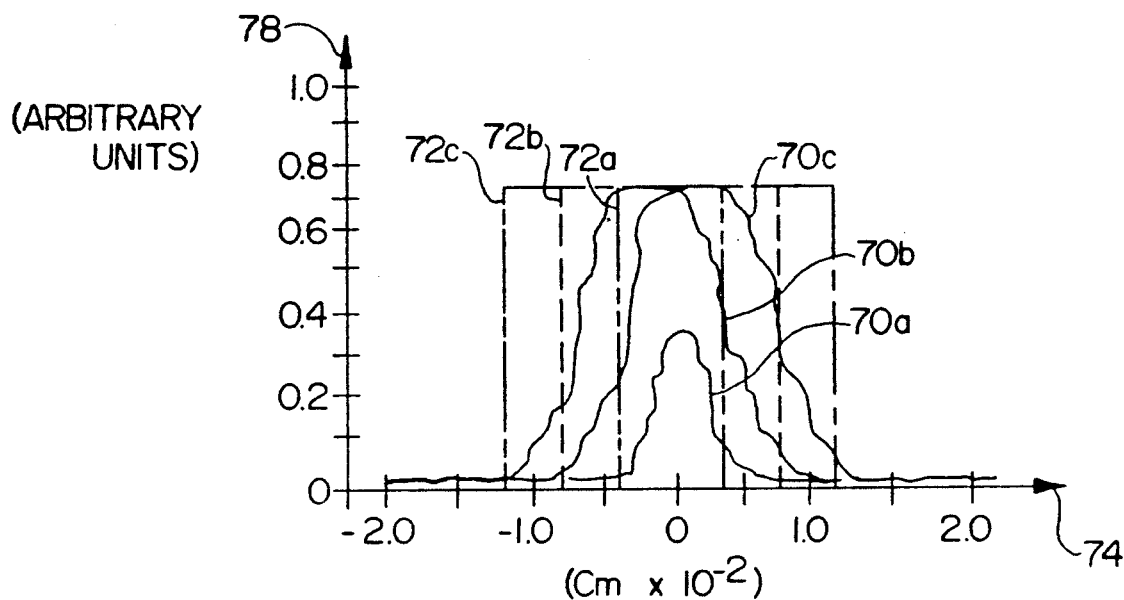
FIG. 5(a) is a graph of the ion charge profile of various pixel spots at the imaging surface, uncorrected for crosstalk.

The effects of compensating the "writing" pixel spot are illustrated by reference to FIGS. 5(a) and 5(b) and FIG. 4. FIG. 5(a) compares graphically the ion charge output profiles of three values of ion current 20, producing individual spots at the imaging surface, uncorrected for crosstalk. Along the horizontal axis 74 are plotted distances along a width dimension of the spot. Along the vertical axis 78 are plotted values of ion charge output, in arbitrary units, measured at various points along the width dimension of the spot. The charge output profile 70a is of a spot produced by one "writing" modulation electrode, for example, electrode 22c (one pixel). That profile may be compared to the charge profile 70b of a spot produced by two contiguous "writing" modulation electrodes, for example electrodes 22b,c and a charge output profile 70c produced by three contiguous "writing" modulation electrodes, for example electrodes 22b,c,d. All of these profiles may be compared to the respective, ideal output profiles 72a,b,c of one "writing" electrode 22c, two contiguous "writing" electrodes, for example electrodes 22b,c, and three contiguous "writing" modulation electrodes, for example electrodes 22b,c,d. The integrated ion current 20 of the single pixel output profile 70a is about 28 percent of the integrated ion current 20 for an ideal single pixel output profile 72a. The integrated ion current 20 of the two pixel charge output profile 70b is about 98 percent of the integrated ion current 20 of the ideal single pixel charge output profile 72a. The integrated ion current 20 of the three pixel charge output profile 70c is about 194 percent of the integrated ion current 20 of the ideal single pixel charge output profile 72a. In general, for a line of any number n of pixels, printed on an ionographic device with h/s~1.5, the actual, integrated charge output is equal to the ideal, integrated charge output from n−1 modulation electrodes 22, where n is greater than one.

Figure 5B:
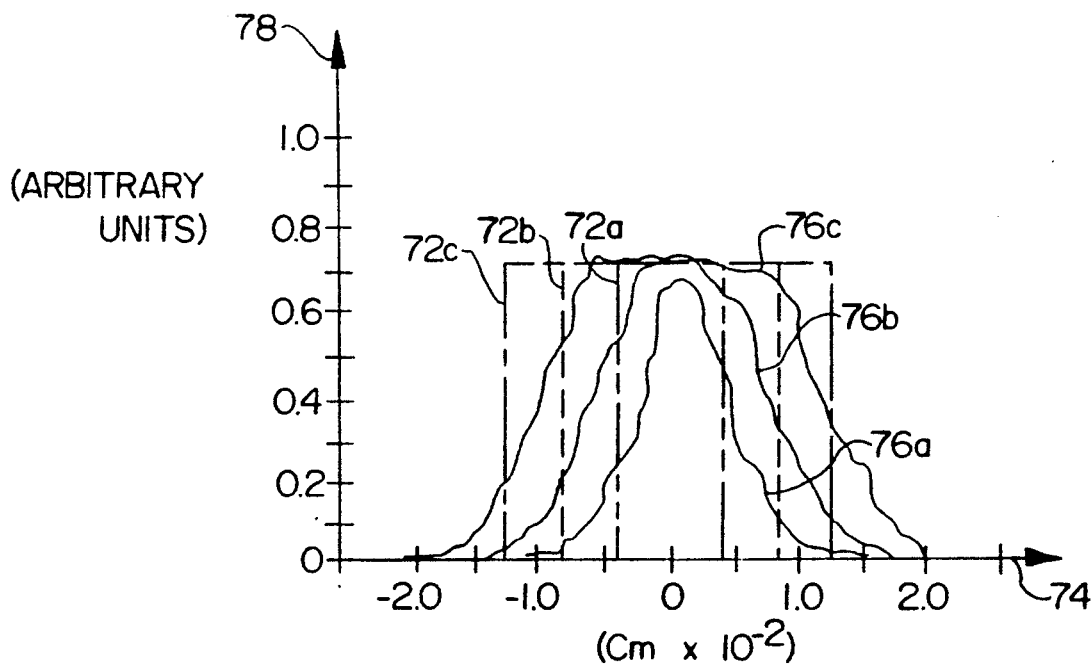
FIG. 5(b) is a graph of the charge profile of various pixel spots at the imaging surface, corrected for crosstalk.

FIG. 5(b) compares graphically the ion charge output profiles for three values of ion current 20, after correction for crosstalk by the present invention. Charge output profiles 76a,b,c are shown for an ion "beam", producing individual spots at the imaging dielectric surface 26, from one, two and three modulation electrodes 22, respectively. Along the horizontal axis 74 are plotted distances along the width dimension of the spot. On the vertical axis 78 are plotted values of ion charge output, in arbitrary units, measured at various points along the width dimension of the spot. In contrast to FIG. 5(a), the profiles for the modulation electrodes 22 depicted in FIG. 5(b) are obtained when the "writing" modulation electrode for example modulation electrode 22c, or group of two modulation electrodes 22b,c or group of three modulation electrodes 22b,c,d is bordered on either side by modulation electrodes 22 held at modulation voltages of $V_M/2$. In the case of a single "writing" modulation electrode 22c, the voltage states of four contiguous modulation electrodes, in the earlier described notation are: 0, ½, 1, ½, 0. For two "writing" modulation electrodes, the voltage states for five contiguous modulation electrodes are: 0, ½, 1, 1, ½, 0. For three "writing" modulation electrodes, the voltage states for six contiguous modulation electrodes are: 0, ½, 1, 1, 1, ½, 0. It is seen from examination of FIGS. 5(a) and 5(b) that application of compensating modulation voltage $V_M'$, equal to $V_M/2$, to electrodes immediately adjacent to "writing" modulation electrodes 22c, "writing" modulation electrodes 22b,c or "writing modulation electrodes 22b,c,d, compensates for the loss due to crosstalk of ions from the local ion current 20. In experimental data represented by FIG. 5(b), the integral of the output profile 72a,b,c from compensated one, two and three "writing" modulation electrodes 22 was measured to be 106%, 192% and 293% respectively, of the ideal single modulation electrode 22 integrated output. Ideal integrated output would of course be 100%, 200% and 300%, respectively.

In addition to density compensation of the ion current 20, described above, appropriate choice and application of non-symmetric values of partial modulation voltage $V_M'$ are used to steer the ion "beam" to reduce or eliminate discontinuities in the edges of printed lines or characters. This effect is shown by reference to FIG. 6 and FIG. 4.

Figure 6:
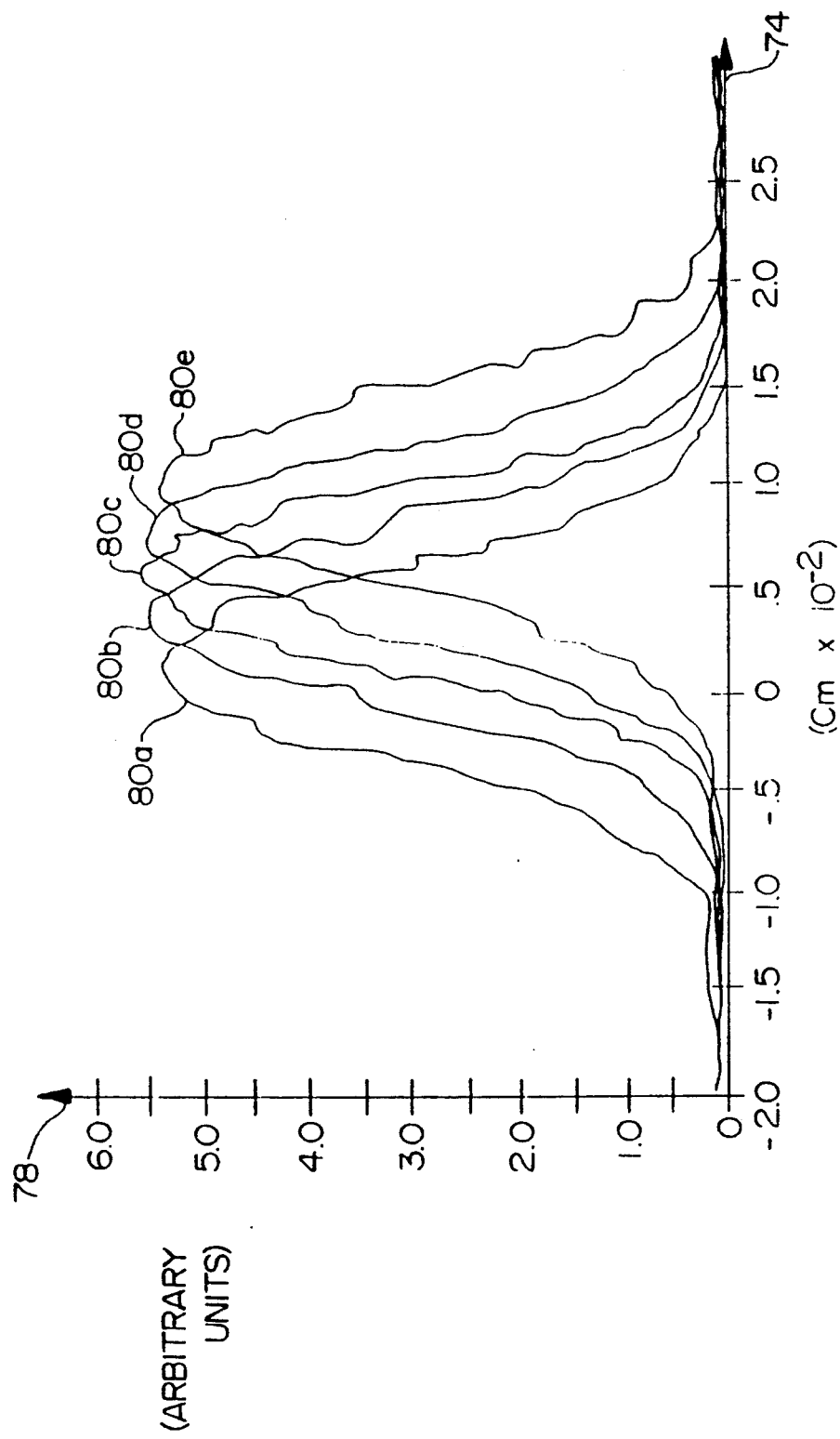
FIG. 6 is a plot of the charge profile of a single pixel spot on the imaging surface with various partial modulation voltages applied to adjacent modulation electrodes, showing how the centroid of the pixel spot can be moved thereby.

FIG. 6 depicts graphically a comparison of charge profiles 80a,b,c,d,e of an ion current 20, producing a spot from a single "writing" modulation electrode 22 on the imaging dielectric surface 26, under five separate conditions of partial modulation voltage $V_M'$ applied to adjacent modulation electrodes 22. Along the horizontal axis 74 is plotted the distance along the width of the spot, zero being the centroid axis of an output profile 80a for a single modulation electrode 22, symmetrically compensated. Along the vertical axis 78 are plotted values of ion current 20, in arbitrary units, measured at various points along the width dimension of the spot. Development of a pre-defined algorithm for steering the ion beam and implementation of the algorithm in the data processor are discussed in the following paragraphs.

We consider here four contiguous modulation electrodes 22a,b,c,d. The first output profile 80a is produced by voltage states of the four contiguous modulation electrodes 22a,b,c,d, proceeding from electrode 22a to electrode 22d, of: ½, 1, ½, 0, using the previously described notation. All other nearby modulation electrodes 22 are held at a voltage of $V_M$ (0 in the notation). The second output profile 80b is produced by voltage states of the four contiguous modulation electrodes 22a,b,c,d, respectively of: ¼, 1, ¾, 0. The third output profile 80c is produced by voltage states of the four contiguous modulation electrodes 22a,b,c,d of: 0, 1, 1, 0. The fourth output profile 80d is produced by voltage states of the four modulation electrodes 22a,b,c,d, respectively of: 0, ¾, 1, ¼. The fifth output profile 80e is produced by voltage states on the four contiguous modulation electrodes 22a,b,c,d, respectively of: 0, ½, 1, ½. Each of the five output profiles 80a,b,c,d,e is similar in shape and the centroid of each succeeding profile is shifted nearly one-quarter of the spacing s between modulation electrodes 22.

If it is assumed from the above results that at most only three contiguous modulation electrodes, for example, a first modulation electrode 22a, a second modulation electrode 22b, and a third modulation electrode 22c, need be addressed to produce a spot, and to obtain the corrected ion current 20 the sum of the three addressed modulation electrodes 22a,b,c must be equal to 2 in the described notation, then a simple algorithm to position the centroid of the spot produced by a single modulation electrode is:

$$x = 1 - a - \frac{b}{2} \quad \text{(Equation 1)}$$

where x is the centroid distance measured from the second "writing" modulation electrode 22b, a is the value of partial modulation voltage applied to the first modulation electrode 22a, and b is the value of partial modulation voltage $V_M'$ applied to the second modulation electrode 22b. A positive result indicates the centroid x lies in the direction of the third modulation electroide 22c from the second modulation electrode 22b. A negative result indicates the centroid x lies in the direction of the first modulation electrode 22c. Thus, as an example, when the three contiguous modulation electrodes 22a,b,c have respective voltage states of ½, 1, ½, then the centroid is at the second modulation electrode 22b. Two limiting cases are when the contiguous modulation electrodes 22a,b,c have voltage states respectively of 1, 1, 0 or 0, 1, 1. From Equation 1, the centroid x of the spot is then at a distance, respectively, of $-\frac{1}{2}$ and $+\frac{1}{2}$ of modulation electrode spacing s. Experimental results using the algorithm of Equation 1 show high addressability of a single ion "beam" spot.

It should be appreciated that use of partial modulation voltage $V_M'$ to deflect the ion "beam" is different from the use of partial modulation voltage $V_M'$ to increase the density of the ion "beam". In the former instance, the ion "beam" is deflected with little change in its output charge profile. This is an advantage if toners are used which do not support a large number of grey levels, for example, high gamma toners. In such a case, improvement of image quality is obtainable with the present invention because compensating modulation voltage $V_M'$ can be used to control the position of the ion "beam" spot, without introducing intermediate ion charge output levels.

The foregoing discussion has focussed on the printing of a single ion "beam" spot. It is clear that the invention can be applied to shift the edge of an ion "beam" that is much wider than that produced by the ion "beam" spot described above. For instance, the edge of printed line or character can be shifted laterally with more precision than the modulation electrode spacing s without essential change to the charge output profile of the ion current 20. Such a shift will reduce or eliminate jagged edges of such printed lines or characters.

The particular algorithms describe above which steer the ion "beam" are only a few of many which may be employed. Further, by appropriate choice of values of partial modulation voltage $V_M'$ and application to the proper modulation electrodes 22, the spot width as well as position may be changed.

Correction algorithms for use in the present invention have been developed for ionographic grey-level printing. These algorithms are used to compute values of partial modulation voltage $V_M'$ over three adjacent modulation electrodes much as for the earlier described cases. In general, a grey-level image will be corrected for cross talk interaction by extending dark printed areas laterally.

Figure 7:
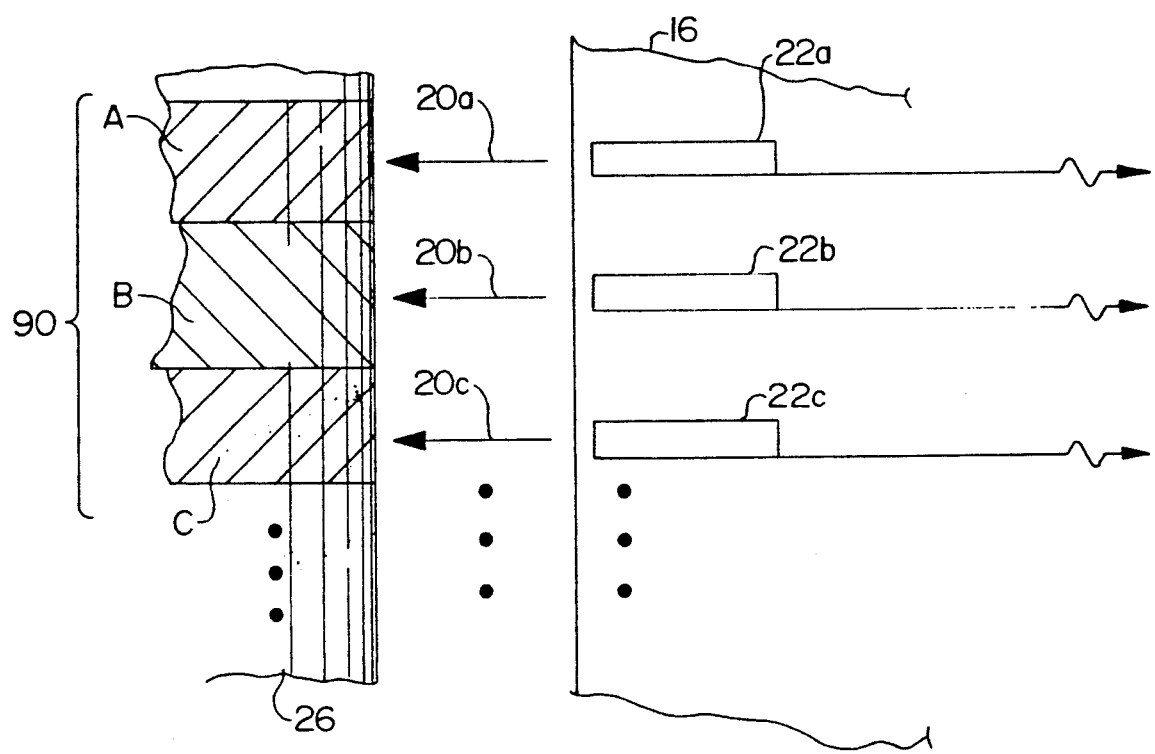
FIG. 7 is a schematic diagram of several modulation electrodes in printing position, useful in understanding the construction of grey-scale algorithms.

Refer now to FIG. 7 which shows a plan view of a portion of a print array 16 containing three modulation electrodes 22a,b,c, of interest for discussion of correction for interaction by means of the present invention, of an edge 90 of a line or character which is to be printed at any number of bits per pixel grey-scale resolution. There is an ion current stream 20a,b,c associated with each modulation electrode 22a,b,c which flows to the imaging surface of the dielectric substrate 24. The printed output associated with each modulation electrode 20a,b,c is A, B and C respectively. The edge 90 is composed of the printed output A,B,C. It is most optically dense (darkest) when a voltage $V_M$ applied to a modulation electrode 22a,b,c has the value of the reference voltage $V_H$, and is least optically dense (whitest) when the voltage $V_M$ is maximum. Of course in grey-level printing, $V_M$ might have any value at any instant.

A typical correction will extend a printed edge which proceeds from a dark area to a light area by applying a partial modulation voltage $V_M'$ the center modulation electrode 22b. When the most optically dense printed output is, for example A, then the algorithm for compensating the center modulation electrode to be corrected by extending the darker printed areas laterally towards the center modulation electrode 22b is as given in Equation 2:

$$B' = A + f(B - A) \quad \text{(Equation 2)}$$

where B' is the compensated printed output and f is a parameter which may be a constant or may be made a function of the difference in printed output A,B,C of neighboring modulation electrodes 22.

If the edge is reversed, for example C is most optically dense and A is the least optically dense, then the algorithm becomes:

$$B' = C + f(B - C) \quad \text{(Equation 3)}$$

If f is made constant, say, ½, it can be seen that a binary edge where, in previously described notation, $A=1$, $B=0$, and $C=0$, the algorithm converts the printed output into $A=1$, $B=½$, $C=0$.

One example of implementation of this algorithm is to apply the following logic to the intercepted printing commands 44:

If $A>B$, then $j=1$, else $j=0$     (Equation 4)

If $C>B$, then $k=-1$, else $k=0$     (Equation 5)

If $j+k>0$, then $B'=A+f(B-A)$     (Equation 6)

If $j+k<0$, then $B'=C+f(B-C)$     (Equation 7)

The correction is applied to each modulation electrode 22 by viewing it as the center one of a group of three modulation electrodes 22 and proceeding progressively across the print array 16 in steps of one modulation electrode 22. Corrections are made by reference to the modulation voltage ($V_M$) contained in the incoming printing commands 44.

It should be appreciated that there may be more efficient implementations of the above algorithm for use with the invention, depending on the nature of the computation. The above algorithm, as all the other algorithms given as examples may be implemented in software, firmware or specialized hardware.

The invention has been described with reference to a preferred embodiment. Various alternatives, modifications or variations of the embodiment and the algorithms described may be made by others skilled in the art from this teaching which are within the scope and spirit of this invention and are intended to be encompassed by the following claims.

A list of drawing numerals has been included with this specification to assist the reader. The reference numerals are provided as an aide to interpretation of the drawings and are not intended to limit the scope of the claims which follow.

LIST OF REFERENCE NUMERALS

FIG. 1

10 Print head
12 Ion chamber
14 Air flow
16 Print array
18 Corona wire
20 Ion current
21 Insulating substrate
22 Modulation electrode
23 Thin film layer
24 Modulation channel
25 Modulation channel wall
26 Dielectric surface of receptor
28 Receptor
30 Receptor voltage source
32 Modulation voltage source
34 Reference potential source
36 Reference potential
38 Electronic switch
$V_H$ Reference voltage
$V_M$ Modulation voltage

FIG. 2(a)

10 Print Head
21 Insulating substrate
22(a,b,c) Modulation electrodes
24 Modulation channel
39 Electric field
h Height of modulation channel
s Spacing of modulation electrodes
$V_H$ Reference voltage
$V_M$ Modulation voltage

FIG. 2(b)

10 Print head
21 Insulating substrate
22(a,b,c) Modulation electrodes
24 Modulation channel
39 Electric field
h Height of modulation channel
s Spacing of modulation electrodes
$V_H$ Reference voltage
$V_M$ Modulation voltage

FIG. 3

16 Print array
20(a,b,c,d,e) Ion currents
22(a,b,c,d,e) Modulation electrodes
32 Modulation voltage source 34 Reference potential source
36 Reference potential
38 Electronic switch
40 Pixel charge compensator
42 Partial modulation voltage source
44 Printing driver commands
46 Data processor
48 Modified printing commands
50 Controller
52 Switch controller circuit
$V_H$ Reference voltage
$V_M$ Modulation voltage
$V_M'$ Partial modulation voltage

FIG. 4

16 Print array
20(a,b,c,d) Ion currents
22(a,b,c,d) Modulation electrodes
32 Modulation voltage source
34 Reference potential source
36 Reference potential
38 Electronic switches
40 Pixel charge compensator
42(a,b,c,d) Partial modulation voltage sources
44 Printing driver commands
46 Data processor
48 Modified printing commands
50 Controller
60 Voltage adjust controller circuit
64(a,b,c,d) Voltage adjust devices
$V_H$ Reference voltage
$V_M$ Modulation voltage
$V_M'$ Partial modulation voltage

FIG. 5(a)

70(a) Charge output profile for a single pixel uncorrected for crosstalk
70(b) Charge output profile for two pixels uncorrected for crosstalk
70(c) Charge output profile for three pixels uncorrected for crosstalk
72(a) Ideal charge output profile for single pixel
72(b) Ideal charge output profile for two pixels
72(c) Ideal charge output profile for three pixels
74 Spot width axis
78 Pixel charge output axis

FIG. 5(b)

72(b) Ideal charge output profile for single pixel
72(b) Ideal charge output profile for two pixels
72(c) Ideal charge output profile for three pixels
74 Spot width axis
76(a) Charge output profile for single pixel corrected for crosstalk
76(b) Charge output profile for two pixels corrected for crosstalk
76(c) Charge output profile for three pixels corrected for crosstalk
78 Pixel charge output axis

FIG. 6

74 Spot width axis
78 Pixel charge output axis
80(a) Pixel spot charge output profile, uncorrected
80(b,c,d,e) Pixel spot charge output profiles.

FIG. 7

16 Print array 20a,b,c Ion currents
22a,b,c Modulation electrodes
26 Dielectric surface of receptor
90 Printed line or character
A Printed output of modulation electrode 20a
B Printed output of modulation electrode 20b
C Printed output of modulation electrode 20c

What is claimed is:

1. In an ionographic imaging device having a print head (10) having a source of ions, a modulation voltage source (32) having a modulation voltage ($V_M$), a modulation channel (24) held at a reference potential (36) by connection to a reference voltage source (34) having a reference voltage ($V_H$) and in which is positioned a print array (16) including a plurality of modulation electrodes (22), an application means (38) for individually holding each one of said plurality of modulation electrodes (22) at a state of bias by applying said modulation voltage ($V_M$) to each one of said modulation electrodes (22) in response to a plurality of printing driver commands (44), and a means for moving ions in a stream through said modulation channel (24), the application of said modulation voltage ($V_M$) creating an electric field (39) which deflects said ions and thereby removes said ions from said stream to modulate said stream projected as a plurality of ion currents (20) past said plurality of modulation electrodes (22) from said print head (10) to form an image of individual pixel charges deposited on a dielectric surface (26) of a receptor (28), an improvement for positioning and compensating said image of individual pixel charges for a loss of said ion currents (20) due to a crosstalk interaction, said crosstalk interaction being a redirection of said electric field (39) associated with one of said plurality of modulation electrodes (22) held at said modulation voltage ($V_M'$) into an ion stream associated with an adjacent one of said plurality of modulation electrodes (22) which is held at a different voltage during printing, comprising:

a compensation means (40) for creating modified printing commands (48) which govern applying one of a plurality of partial modulation voltages ($V_M'$) in substitution of said modulation voltage ($V_M$) and said reference voltage ($V_H$) to each one of said plurality of modulation electrodes (22) neighboring and including each of said plurality of modulation electrodes (22) past which one of said plurality of ion currents (20) is flowing during printing; said compensation means (40) having a pre-defined and implemented, image-dependent algorithm means for determining a value for each one of said partial modulation voltages ($V_M'$) being applied, said value being a fraction of said modulation voltage ($V_M$), said image-dependent algorithm means including means for determining for which of said modulation electrodes (22) said modified printing commands (48) are created; and a plurality of partial modulation voltages sources (42);

said compensation means (40) intercepting said printing driver commands (44) and creating therefrom said modified printing commands (48) which define a new said state of bias, by substituting for said printing driver commands (44), commands to which said application means (38) responds by applying one of said plurality of partial modulation voltages ($V_M'$) to each one of said plurality of modulation electrodes (22) in accordance with said pre-defined, image-dependent algorithm means;

said compensation means (40) being coupled to voltage sources, including said modulation voltage source (32), said reference voltage source (34), and said plurality of partial modulation voltages sources (42), and being coupled to each one of said plurality of modulation electrodes (22).

2. An apparatus as claimed in claim 1 in which said compensation means (40) comprises:

a data processing means (46) for converting said printing driver commands (44) to said modified printing commands (48), each of said modified printing commands (48) related to one value of voltage selected from said modulation voltage ($V_M$), said plurality of partial modulation voltages ($V_M'$) determined by said pre-defined and implemented, image-dependent algorithm, and said reference voltage ($V_H$), and further related to one of said plurality of modulation electrodes (22);

a controller means (50), responsive to said modified printing commands (48), for addressing each one of said plurality of modulation electrodes (22) in said print array (16), said controller means (50) including means for making deliberate use of said crosstalk interaction by connecting one of said voltage sources (32,34,42) having said related one value of voltage ($V_M$, $V_M'$, $V_H$) to each addressed one of said plurality of modulation electrodes (22);

said data processing means (46) coupled to and driving said controller means (50) with said modified printing commands (48).

3. An apparatus as claimed in claim 2 in which said controller means (50) further comprises:

a switch controller circuit (52); and a plurality of electronic switches (38a,b,c,d);

said switch controller circuit (52) receiving said modified printing commands (48) through a coupling from said data processing means (46) and being further coupled to and positioning each one of said plurality of electronic switches (38a,b,c,d) to connect one source of voltages selected from a plurality of said partial modulation voltages sources (42), said modulation voltage source (32) and said reference voltage source (34), to each one of said plurality of modulation electrodes (22) depending upon received said modified printing commands (48).

4. An apparatus as claimed in claim 2 in which said controller means (50) further comprises:

a voltage adjustment controller circuit (60); and a plurality of electronic voltage adjustment devices (64a,b,c,d);

said voltage adjustment controller circuit (60) receiving said modified printing commands (48) through a coupling from said data processing means (46) and being further coupled to and adjusting each one of said plurality of electronic voltage adjustment devices (42a,b,c,d,e) to apply one value of voltage selected from said plurality of partial modulation voltages ($V_M'$) said modulation voltage ($V_M$), and said reference voltage ($V_H$), to each one of said plurality of modulation electrodes (22) depending upon received said modified printing commands (48).

5. An apparatus as claimed in claim 2 in which each said value of said plurality of partial modulation voltages ($V_M'$), determined by said predefined and implemented image-dependent algorithm means, lies between a value of said reference voltage ($V_H$) and a value of said modulation voltage ($V_M$).

6. An apparatus as claimed in claim 2 in which a like value of one of said plurality of partial modulation voltages ($V_M'$) is applied to each first one of said plurality of modulation electrodes (22) located immediately adjacent to a second one of said plurality of modulation electrodes (22) past which said second one of said plurality of modulation electrodes (22) there is a flow of ion current (20).

7. An apparatus as claimed in claim 5 in which each one of said plurality of partial modulation voltages ($V_M'$) is determined by said predefined and implemented, image-dependent algorithm means in responses to a desired grey-level output from each one of said plurality of modulation electrodes (22).

8. An apparatus as claimed in claim 6 in which each one of said plurality of partial modulation voltages ($V_M'$) is fixed at a value of one-half of said modulation voltage ($V_M$).

9. A method of positioning and compensating individual pixel charges for a loss of ion current (20) due to a crosstalk interaction in an ionographic imaging device, said device having a print head (10) having a source of ions, a modulation voltage source (32) having a modulation voltage ($V_M$), a modulation channel (24) held at a reference potential (36) by connection to a reference voltage source (34) having a reference voltage ($V_H$), and in which is positioned a print array (16) including a plurality of modulation electrodes (22), an application means (38) for individually holding each one of said modulation electrodes (22) at a state of bias by applying said modulation voltage ($V_M$) to each one of said modulation electrodes (22), in response to a plurality of printing driver commands (44), and a means for moving ions in a stream through said modulation channel (24), the application of said modulation voltage ($V_M$) creating an electric field (39) which deflects said ions and thereby removes said ions from said stream to modulate said stream projected as a plurality of ion currents (20) past said plurality of modulation electrodes (22) from said print head (10) to form an image of said individual pixel charges deposited on a dielectric surface (26) of a receptor (28), said crosstalk interaction being a redirection of said electric field (39) associated with one of said plurality of modulation electrodes (22) held at said modulation voltage ($V_M$) into an ion stream associated with an adjacent one of said plurality of modulation electrodes (22) which is held at a different voltage during printing, the method comprising the steps of:

intercepting said printing driver commands (44) with a compensation means (40) for creating modified printing commands (48) which govern applying one of a plurality of partial modulation voltages ($V_M'$) in substitution of said modulation voltage ($V_M$) and said reference voltage ($V_H$) to each one of said plurality of modulation electrodes (22), said compensation means (40) having an image-dependent algorithm means;

pre-defining and implementing said image-dependent algorithm means for determining a value of each one of a plurality of partial modulation voltages ($V_M'$) related to each one of said plurality of modulation electrodes (22) held at said modulation voltage ($V_M$) neighboring and including each one of said plurality of modulation electrodes (22) held at a different voltage during printing, said value being a fraction of said modulation voltage ($V_M$), said image-dependent algorithm means determining for which ones of said plurality of modulation electrodes (22) said modified printing commands (48) are created;

determining said value for each one of said plurality of partial modulation voltages ($V_M'$) being applied to each one of said plurality of modulation electrodes (22) by executing said image-dependent algorithm;

creating with said compensation means (40), modified printing commands (48) which define a new said state of bias, by substituting for said printing driver commands (44), commands to which said application means (38) responds by applying one of said plurality of partial modulation voltages ($V_M'$) to each one of said plurality of modulation electrodes (22) in accordance with said image-dependent algorithm means; and making deliberate use of said crosstalk interaction by coupling with said compensation means (40), in response to said modified printing commands (48), each one of said plurality of modulation electrodes (22) to voltage sources, including said modulation voltage source (32), said reference voltage source (34) and said plurality of modulation voltages sources (42), to form a corrected said image of individual pixel charges by augmenting and deflecting said plurality of ion currents (20) during printing.

* * * * *